UNITED STATES PATENT OFFICE.

OSCAR NASTVOGEL, OF ELBERFELD, GERMANY, ASSIGNOR TO THE FARBENFABRIKEN, VORMALS FR. BAYER & CO., OF SAME PLACE.

BLUE DYE.

SPECIFICATION forming part of Letters Patent No. 496,435, dated May 2, 1893.

Application filed September 8, 1892. Serial No. 445,379. (Specimens.)

*To all whom it may concern:*

Be it known that I, OSCAR NASTVOGEL, chemist, doctor of philosophy, a subject of the Emperor of Germany, (assignor to the FARBENFABRIKEN, VORMALS FR. BAYER & CO., of Elberfeld, Germany,) residing at Elberfeld, Germany, have invented a new and useful Improvement in the Manufacture of Dye-Stuffs, of which I give in the following a clear and exact description.

My invention relates to the production of a new blue coloring-matter of the diphenylnaphthylmethane series by combining equal molecular proportions of tetramethyldiamidobenzhydrol and benzylalphanaphthylamine, transforming the thus obtained leuco compound which corresponds to the formula:

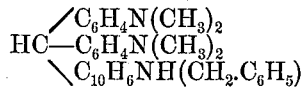

into its so called nitrosoamine derivative by means of nitrous acid or nitrate, oxidizing the nitrosoamine product of the formula:

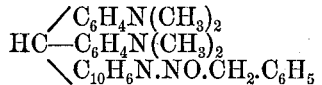

and subsequently splitting off or separating the nitroso group.

The following is a clear and exact description of the process for producing my new coloring-matter: 2.7 kilos, by weight, of tetramethyldiamidobenzhydrol and 2.33 kilos, by weight, of benzylalphanaphthylamine are dissolved in ten kilos, by weight, of warm alcohol and after adding 0.6 kilos, by weight, of glacial acetic acid the solution thus obtained is heated for some hours on the water bath with energetic stirring. After a short time the solution begins to become dull, but soon the precipitate at first oily, solidifies and the crystalline mass separates rapidly. If the precipitation is finished, the mixture is cooled and the leuco base thus obtained is filtered off, pressed and dried at about 100° centigrade. It forms an almost colorless precipitate, melts at from 179° to 180° centigrade. It is difficultly soluble in alcohol, easily dissolves in benzine and is precipitated out of this solution by the addition of alcohol in thin little needles.

In order to convert the said leuco compound into the nitrosoamine 4.85 kilos, by weight, of the leuco base are dissolved without heating in a mixture of sixteen kilos, by weight, of acetic acid (thirty per cent.) and 7.3 kilos, by weight, of muriatic acid (twenty per cent.) and a solution prepared by dissolving 0.7 kilos, by weight, of sodium nitrite in seven kilos of water after cooling is allowed to run slowly into the above solution of the leuco base in diluted acetic and muriatic acid. In this manner a solution of the nitrosoamine of the above said formula results. By adding quickly at ordinary temperature sixteen kilos, by weight, of a lead dioxide paste (fifteen per cent.) and on continually stirring the nitroso amine leuco compound is oxidized which reaction proceeds within a few minutes. The resulting liquid of a deep green color is mixed with five kilos, by weight, of diluted sulphuric acid (twenty per cent.) in order to decompose the lead salts dissolved. Without filtering off the lead sulphate precipitated, a solution obtained by dissolving 1.07 kilos, by weight, of paratoluidine in about twenty kilos, by weight, of muriatic acid (36.5 per cent.) is allowed to flow slowly into the above liquid which is well stirred. The mixture thus formed is cooled to about 10° centigrade and allowed to stand for several hours at ordinary temperature. By operating in this manner the nitroso group of the nitrosoamine obtained by oxidizing the aforesaid nitroso amine leuco compound is separated with great ease. Of course, the separation of the nitroso group can be effected by employing other aromatic amines or by means of moderate reducing agents such as sulphureted hydrogen, sulphurous acid and the like. The reaction is finished when two subsequent samples of the mixture exhibit no change in color after the addition of water. The lead sulphate then is filtered off and eight hundred liters of cold water are added to the filtrate obtained. The dye-stuff separates as a crystalline powder. If it is filtered off, washed out with cold water and purified by redissolving in hot water, salting out by means of common salt, filtering off, pressing and drying. I have found that the same product can also be obtained by the condensation of tetramethyldiamidobenzophenone with benzylalphanaphthylamine in presence of oxychloride of phosphorus or other condensing agents.

The new coloring-matter which possesses according to its production the following composition:

$$C_{34}H_{34}N_3Cl,$$

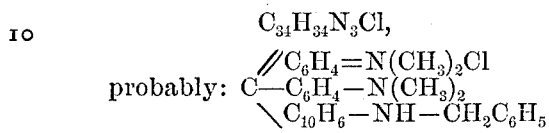

is obtained as a reddish-brown mass with bronze-like or copper-like luster. When pulverized it represents a dark reddish-violet powder. It is easily soluble in hot water with a deep blue color, but only sparingly in cold water. When its hot solutions in water are mixed with diluted acids they assume at first a green, then a greenish-yellow color. In concentrated hydrochloric acid and sulphuric acid it easily dissolves with yellowish-red or brownish-red color and on adding water to these acid solutions at first, a yellow, then a green liquid results and at last the dye-stuff separates. By adding to its watery solutions soda-lye, sodium carbonate or ammonia, the base of the dye-stuff is precipitated as a dark brownish-red flaky mass. It dyes cotton, prepared with tannic acid or the like and also wool in beautiful pure blue shades which are somewhat more reddish, but clearer than those produced by the coloring-matter known in commerce as: "Victoria Blue B." As it possesses a benzyl group the new product can be sulphonated by treating with concentrated or fuming sulphuric acid and a sulpho acid is thus obtained the sodium salt of which easily dissolves in water and dyes wool in a sulphuric acid bath.

Having thus described my invention and in what manner it can be performed, that which I claim as new, and desire to secure by Letters Patent, is—

1. The process of producing new diphenylnaphthylmethane dyes by combining equal molecular proportions of tetraalkyldiamidobenzhydrol and benzylalphanaphthylamine, converting the so formed leuco compounds into nitroso amine products, oxidizing the latter and subsequently splitting off and removing the nitroso group.

2. As a new product, the diphenylnaphthylmethane dye-stuff having the formula:

$$C_{34}H_{34}N_3Cl,$$

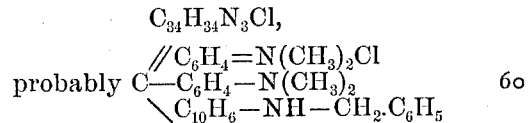

and which is a reddish-brown mass with bronze-like or copper-like luster; which when pulverized represents a dark reddish-violet powder which is easily soluble in hot water with a deep blue color, but only sparingly in cold water; when its hot solutions in water are mixed with diluted acids they assume at first a green, then a greenish-yellow color; in concentrated hydrochloric acid and sulphuric acid it easily dissolves with yellowish-red or brownish-red color and on adding water to these acid solutions at first a yellow, then a green liquid results from which at last the dye-stuff separates, and by adding to its watery solutions soda-lye, sodium carbonate or ammonia the base of the dye-stuff is precipitated as a dark brownish-red flaky mass.

In testimony whereof I have signed my name in the presence of two subscribing witnesses.

OSCAR NASTVOGEL.

Witnesses:
WM. ESSENWEIN,
RUDOLPH FRICKE.